United States Patent [19]

Samokovliski et al.

[11] 4,177,912
[45] Dec. 11, 1979

[54] APPARATUS FOR PLANETARY FEEDING OF ELECTRODE WIRE

[75] Inventors: David A. Samokovliski; Angel S. Angelov; Georgi N. Nachev; Peter D. Petrov; Alfred E. Nemechek; Iliyana I. Vajarova, all of Sofia, Bulgaria

[73] Assignee: CUV "Progress", Sofia, Bulgaria

[21] Appl. No.: 854,536

[22] Filed: Nov. 25, 1977

[30] Foreign Application Priority Data

Nov. 24, 1976 [BG] Bulgaria .................................. 34752

[51] Int. Cl.² .......................................... B65H 17/22
[52] U.S. Cl. .................................. 226/176; 226/181; 414/432
[58] Field of Search ............... 226/176, 177, 181, 186, 226/187; 214/338, 339; 314/78, 59, 60; 219/79, 137.2

[56] References Cited

U.S. PATENT DOCUMENTS

| | | | |
|---|---|---|---|
| 3,347,435 | 10/1967 | Jura | 226/176 |
| 3,413,915 | 12/1968 | Goodwin | 226/181 X |
| 4,049,172 | 9/1977 | Samokovliski | 226/187 X |

*Primary Examiner*—Richard A. Schacher

[57] ABSTRACT

Apparatus for the planetary feeding of electrode wire having means for adjusting the pushing force exerted on the electrode wire by electromagnetic means. Opposed canted rolls are mounted for rotation about their axes upon a first housing part which is rotatable about the axis of an elongated electrode wire which passes between and is fed by the canted rolls. A second housing part, which is disposed coaxially of the first housing part, bears means such as a cam or a cone which interacts with roll adjusting means mounted on the first housing part so as to adjust the force with which the canted rolls engage the electrode wire in accordance with relative motion between the two housing parts. The second housing part is driven for rotation about its axis. The degree of motion of the two housing parts relative to each other, thereby to vary the force with which the canted rolls engage the electrode wire, is determined by an externally controlled electromagnetic means which can be adjusted while the welding apparatus is in continuous operation.

16 Claims, 14 Drawing Figures

FIG. 14
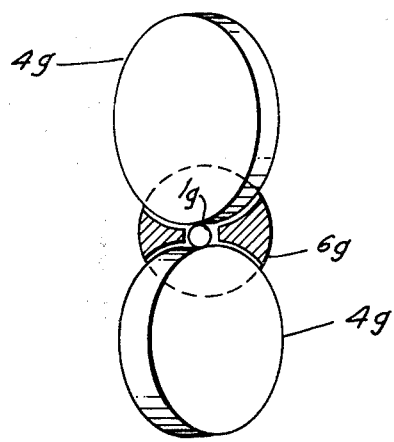
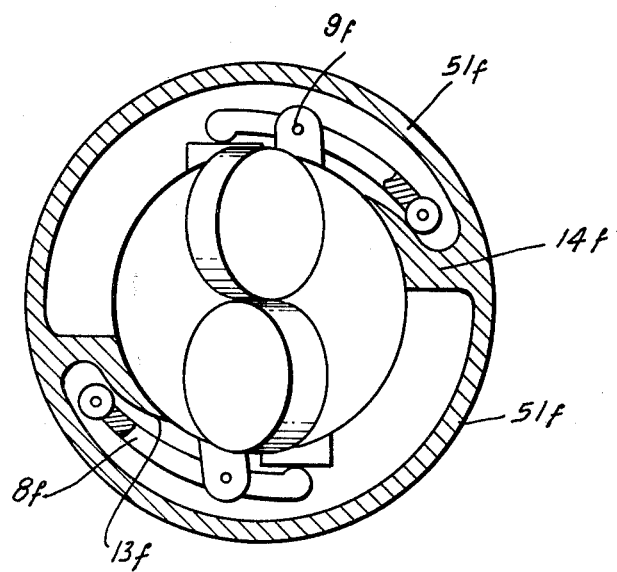
FIG. 12

APPARATUS FOR PLANETARY FEEDING OF ELECTRODE WIRE

This application is related to the following co-assigned Samokovliski et al applications: Ser. Nos. 726,278; 726,279; and 726,412 all filed Sept. 24, 1976; and U.S. Pat. No. 4,049,172 dated Sept. 20, 1977.

This application relates to an apparatus for the planetary feeding of electrode wire, the pushing force exerted by the apparatus upon the electrode wire being adjustable externally of the apparatus.

Embodiments of apparatus of this general type are known, such apparatus being manually adjustable according to the diameter of the electrode wire being fed and according to the desired pushing force to be exerted upon the wire. In such prior apparatus a manually adjustable conical nut with a face thread is employed to make the above described adjustments. The adjustment of the conical nut effects a change of pressure between the feeding rolls and the electrode wire, such pressure being increased or decreased depending upon the direction of adjustment of the nut.

In some prior apparatus of the described type a gauged setting of the pushing force is possible, the force with which the feeding rolls are thrust against the electrode wire being determined by a system of levers and a previously gauged spring.

In some newer designs, such as those disclosed and claimed in the above referred to samokovliski et al applications, the setting of the feeding rolls according to the diameter of the wire and the force of pushing the wire is effected automatically by means of a cam or a cone moving along a thread in an axial direction. Such cam or cone coacts with one arm of double-arm levers, the other arm of such levers varying the pressure with which the wire feeding rolls engage the electrode wire. In these cases the force of inertia of the rotating head of the apparatus is used as kinetic energy for increasing or decreasing the force of engagement between the wire-feeding rolls and the electrode wire.

The above described apparatus, whether provided with manual gauged setting means, have the disadvantage that the resetting thereof from one force to another or from one diameter of electrode wire to another requires the interruption of the welding operation, the opening of the cover of the wire-feeding modules, and the resetting of the planetary head. All of these operations entail a loss of production time.

It is a drawback of prior automatic wire feeding apparatus which function by means of mechanical levers, cams or conical nuts, that the parts thereof require precise machining, and that a maximum inertial difference is necessary between the driving and driven components of the apparatus. Further, such apparatus is much more demanding in its maintenance requirements.

The present invention has as a general object the provision of an apparatus for the planetary feeding of electrode wire which adjusts the pushing force exerted upon the electrode wire by electromagnetic means. In the various embodiments of the apparatus of the invention disclosed herein the electromagnetic means functions (1) by an axial, (2) a tangential, or (3) a sliding electromagnetic field. Such electromagnetic means acts on mechanical elements for moving the wire-feeding rolls toward and away from each other.

In preferred embodiments of the apparatus in accordance with the invention there are employed a plurality of canted wire-feeding rolls of the type disclosed in the above referred to Samokovliski et al applications, such rolls being urged apart as by spring operated pistons. The rolls are mounted upon a first part of a multi-part housing, in one disclosed embodiment there being first-class levers pivoted upon such first part of the housing which acts in a known manner to adjust the feeding rolls, and in another embodiment the apparatus functioning without levers in a known manner, in both embodiments the feeding rolls being adjusted by relative movement between such first housing part and a second housing part, the two housing parts rotating about the longitudinal axis of the electrode wire being fed. The second housing part includes a regulating element, shaped as a cam or a cone, which moves relatively to the direction of rotation of the multi-part housing and/or with respect to the direction of feeding of the electrode wire. Such relative motion between the housing parts is produced by an axial, a tangential, or a sliding electromagnetic field.

The axial magnetic field is produced by a coil with electric windings, which embraces or is embraced by a cylindrical sleeve, hereinafter sometimes designated a dynamic element, which can be moved axially by the magnetic field produced by the coil, in the direction of feeding of the electrode wire in the opposite direction. The dynamic element is connected to the regulating element (cone or cam), which effects the adjustment of the canted feed rollers through the intermediary of the described levers or the like. Such levers are moved perpendicularly to the direction of movement of the first housing part relative to the second housing part to which the cam or cone is fixedly attached.

When the apparatus of the invention functions with a tangential electromagnetic field, there may be used the same known lever and cone mechanism for pressing the wire-feeding rolls against the wire, and the motion of the back end of the levers perpendicularly to the axis of the housing on the direction of feeding of the electrode wire is effected by the action of the tangential electromagnetic field.

A cylindrical body, which is a sleeve or disc made of magnetic material, is moved relatively to the regulating element by the action of the electromagnetic field. The portion of the housing of the wire-feeding apparatus, which carries the canted electrode wire feeding rolls, is fastened rigidly to the shaft of a motor and rotates with it. Such part of the housing entrains the dynamic element which, however, is subjected to the resistance against turning of the tangential magnetic field of the electromagnet. Such electromagnet may be disposed either inside or outside a cylindrical body connected to the regulating element, and the result is a relative lagging behind of the dynamic element with respect to the direction of rotation of the first portion of the housing. The other end of the dynamic element, for example, actuates levers, cones and pistons with the associated canted rolls toward the electrode wire, thus effecting an increased or decreased force of engagement between the rolls and the electrode wire.

In yet another embodiment in accordance with the invention the coil of the electromagnet is wound radially onto a cylindrical core. The electromagnetic field produced by such coil is closed through the core of the stater, the air gap and the dynamic element, thereby setting in motion the cam or cone, and by means of them adjusting the wire-feeding rolls toward or away from each other.

The apparatus of the present invention has the following advantages:

It permits an automatic setting of the feeding apparatus according to the diameter of the electrode wire and to the desired force of pushing the wire, without the necessity of opening the apparatus.

It permits a remote regulation of the force of pushing the electrode wire before the starting of the welding apparatus, as well as during its operation.

It permits a fine regulation of the pushing force exerted upon the electrode wire depending upon the material being fed (such as the steel, aluminum, or pipe-type electrode wire) before the welding operation is started, as well as during the welding operation.

For a better understanding of the invention, reference should be made to the accompanying drawings in which there are illustrated and described preferred embodiments of the invention.

In the drawings:

FIG. 1 is a view in longitudinal axial section of a first embodiment of an apparatus wherein the pushing force is exerted upon the electrode wire by electromagnetic means, such means producing an axial magnetic field;

FIG. 2 is a similar view of a second embodiment of the apparatus of the invention wherein the adjustment of the pushing force exerted upon an electrode wire is effected by an eddy or sliding magnetic field produced by an external or outer coil, such magnetic field acting upon a nut bearing a conical surface, the nut being threaded upon a part of the housing bearing the canted, electrode feeding rolls, and being axially adjustable with respect thereto;

FIG. 12 is a view in transverse section, the section being taken along the line B—B of FIG. 11;

FIG. 14 is a view in section taken along the line C—C of FIG. 13.

It will be seen from the above that there are shown herein seven embodiments of electrode wire feeding apparatus in accordance with the invention, such embodiments being shown in FIGS. 1, 2, 5, 6, 9, 11, and 13, together with variations in various ones of the disclosed embodiments, as in FIGS. 3, 4, 7 and 8 of the construction of the electromagnetic adjusting means.

Figure 1:
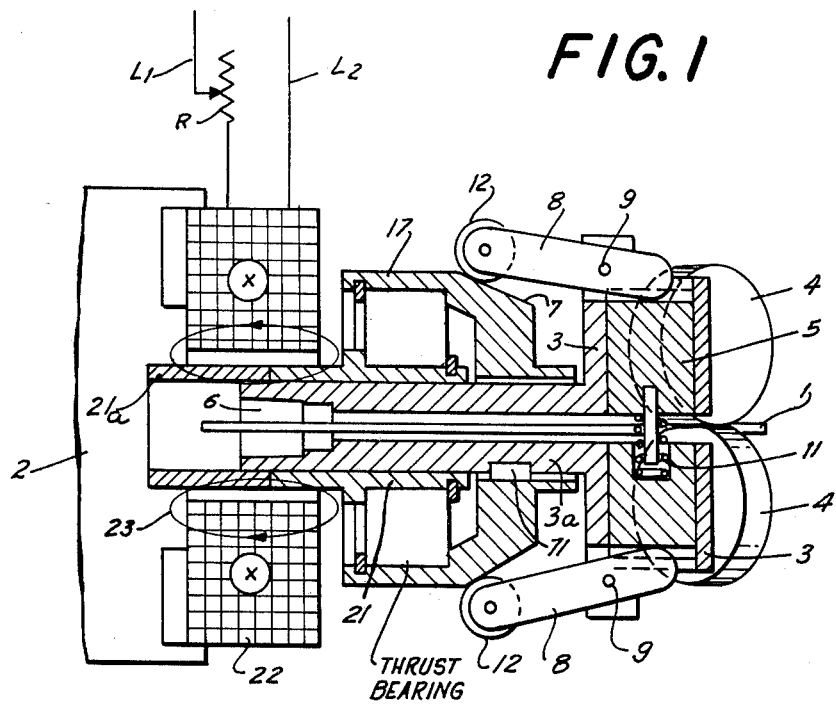

Turning first to FIG. 1, it will be seen that the embodiment of the apparatus in accordance with the invention there shown comprises an electric motor 2 having a hollow driving shaft 6 which is disposed coaxially of and drivingly connected to the left-hand end of a sleeve-like portion integral with a front or right-hand housing part 3 of the apparatus. Housing part 3 carries opposed radially disposed pistons 5 on which there are journaled canted electrode wire feeding rolls 4. The pistons are constantly urged apart by coil compression springs, of which one is shown at 11, each piston being provided with a spring which acts between it and the housing part 3.

First class levers 8 are mounted on pivot pins 9, levers 8 lying in the plane of the longitudinal axes of the pistons 5 and the electrode wire 1. The outer free end of each right-hand arm of levers 8 engages the radially outer end of the corresponding piston 5, the other arm of each lever 8 bearing a roller 12 which engages the conical working surface 7 of a regulating element 17. The levers 8 are pivoted and the pistons 5 are moved radially of the housing part 3 by relative axial motion between the housing part 3 and the housing part 17. The housing part 17 is supported by a thrust bearing disposed between it and a sleeve 21, which is a dynamic part, the bearing preventing axial movement between sleeve 21 and housing part 17 while permitting relative rotation therebetween and permitting the housing part 17 to rotate with housing part 3.

The left-hand portion of housing part 3 is in the form of a hollow shaft 3a to which the hollow shaft 6 of the driving motor 2 is attached and upon which the sleeve 21 is mounted for axial movement with respect thereto. Members 17 and 3a are connected for joint synchronous rotation by a key 71 in part 3a which slides in an axially extending groove in the axial bore through the right hand portion of member 17. The left-hand end 50 of the sleeve 21, which is made of ferro-magnetic material, projects somewhat further to the left than the left-hand end 35 of the portion 3a of housing part 3. The main portion of sleeve 21 and portion 3a of the housing part 3 are made of non-magnetic material such as brass or bronze. The left-hand end portion 21a of sleeve 21 is made of ferromagnetic material such as iron.

A radially wound toroidal coil 22 disposed axially of sleeve 21, is fastened rigidly to the housing of electric motor 2. When coil 22 is energized portion 21a of sleeve 21 acts as the plunger of a solonoid, portion 21a tending to be drawn into the coil in the direction to the right, thereby to minimize the reluctance of the magnetic path through the pole pieces of the coil and the portion 21a of the sleeve 21. Such movement of the sleeve is opposed by the coil compression springs 11. The point of equilibrium is determined by the strength of the magnetic field 23, and thus the amperage of the current flowing through the coil 22. The axial position of the sleeve 21 determines the transverse location on conical surface 7 of member 17 which is engaged by the rollers 12, and thus also determines the spacing between opposite feeding rolls 4.

Figure 2:
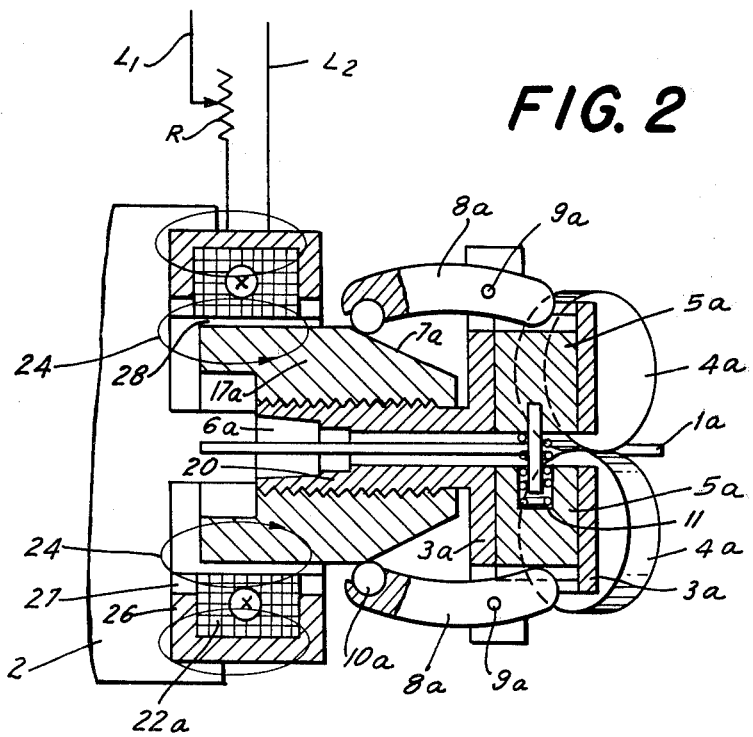

A second embodiment of the apparatus in accordance with the invention is shown in FIG. 2 wherein parts similar to those shown in FIG. 1 are designated by the same reference characters with an added a.

In FIG. 2, the regulating element i.e. the cone 17a, is screwed by means of thread 20 onto housing part 3a. The coil 22a with radial windings and an iron core 26 with slits 27, is fastened rigidly to the body of motor 2a, embracing the outer cylindrical surface of cone 17a, which is made of ferromagnetic material and in this case acts as a dynamic element.

The apparatus of FIG. 2 functions as follows:

When a current is supplied to coil 22a, there is produced an eddy electromagnetic field 24 through the iron core 26, the air gap 28, and the body of cone 17a, such electromagnetic field counteracting the rotation of cone 17a which is rotated by the electric motor 2a together with the housing part 3a. As a result, the cone 17a is rotated relatively along thread 20 with respect to housing part 3a and, thus it is moved in an axial direction so as to separate the left-hand ends of levers 8a. Because the conical surface 7a both rotates with respect to the levers 8a as well as moving axially with respect thereto, the cone-following elements 10a in this instance take the form of balls seated in sockets on the ends of the levers 8a. It will be seen that energization of the coil 22a to a varying degree will vary the pressure which the canted feeding rollers 4a exert upon the electrode wire 1a.

Figure 3:
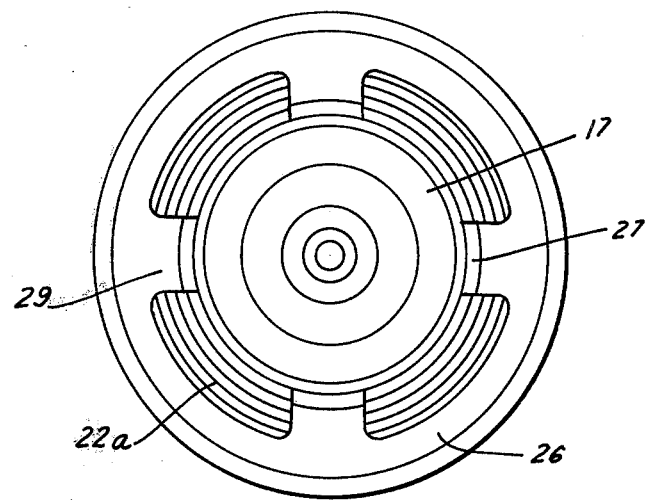
FIG. 3 is a view in end elevation of the coil for producing an eddy or sliding magnetic field in the apparatus of FIG. 2, such coil being disposed radially outwardly of the nut bearing a conical adjusting surface shown in FIG. 2.

In FIG. 3 the external toroidal electromagnet 22a is shown in somewhat greater detail. As there evident, the coil is provided with an external core.

Figure 4:
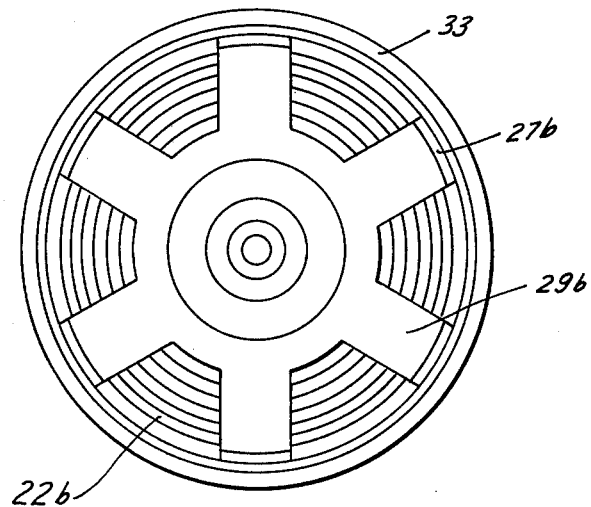
FIG. 4 is a view similar to FIG. 3 of a coil for producing an eddy or sliding magnetic field, the coil being disposed radially inwardly with respect to the regulating member which is connected to the nut bearing a conical adjusting surface.

In FIG. 4, a similar electromagnet 22b is shown, such coil however employing an internal core rather than an external core as in FIG. 3. In FIG. 4 the iron core is designated 32, the pole pieces of such core are designated 29b, the slit or bevel on the ends of the pole pieces are designated 27b, and the outer dynamic element is designated 33.

Figure 5:
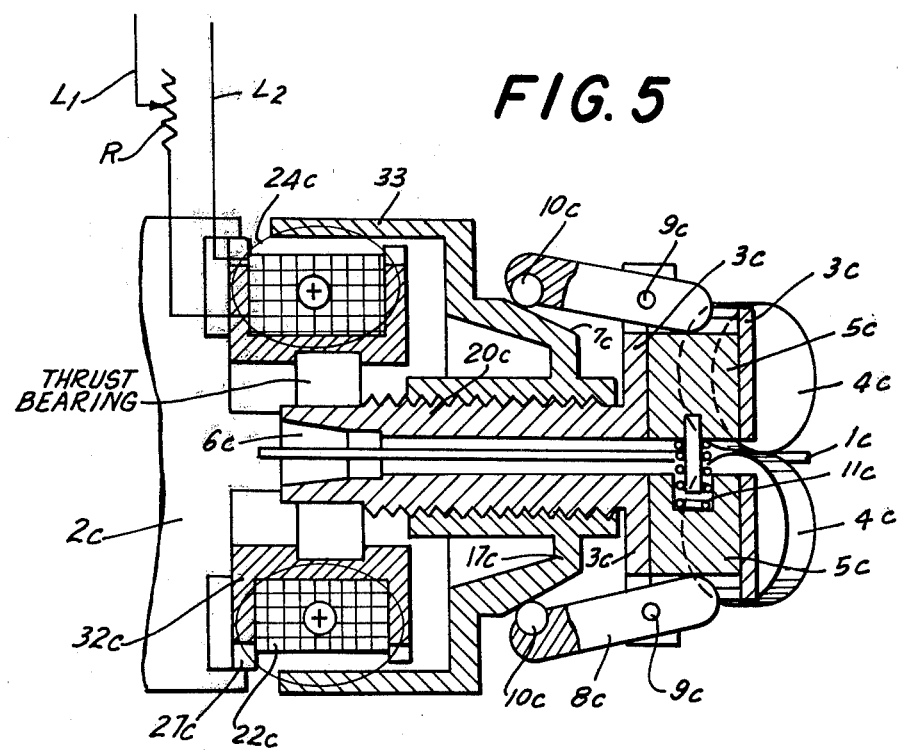
FIG. 5 is a view in longitudinal axial section of a third embodiment of apparatus in accordance with the invention, such apparatus adjusting the pushing force exerted upon an electrode wire by an eddy or sliding magnetic field, the field being produced by an internal coil and acting on a conical nut rotating along a thread.

In the embodiment of the apparatus shown in FIG. 5 parts which are generally similar to those shown in FIG. 5 are designated by the same reference characters as in FIG. 2 but with the addition of the suffix c rather than a.

It is to be noted that the right-hand end portion of the apparatus shown in FIG. 5 is generally the same as that shown in the right-hand end of FIG. 2. The left-hand end of the apparatus employs an electromagnetic coil with an internal core, such construction being that of FIG. 4. The coil 22c of FIG. 5 is shaped as a star with several sector poles 29 in which there are machined additional slits 27. Coil 22c is wound around the core. The apparatus of FIG. 5 functions in the same manner as that of FIG. 2.

Figure 6:
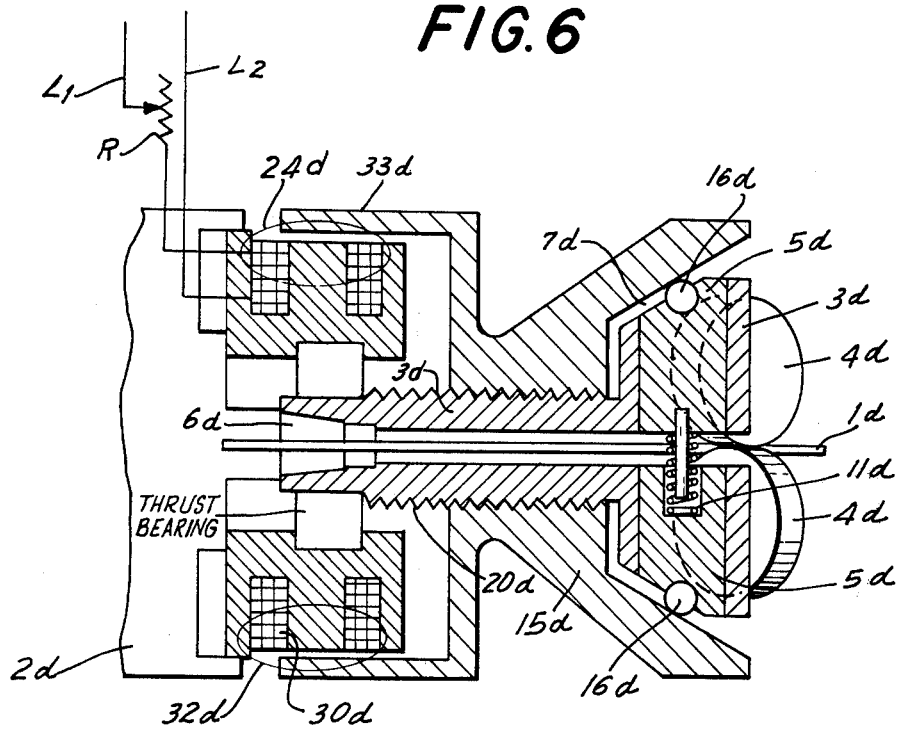
FIG. 6 is a view in longitudinal axial section of a fourth embodiment of apparatus for adjusting the pushing force exerted upon an electrode wire, such adjustment being effected by a tangential magnetic field which acts on a conical nut rotating along a thread, the nut directly effecting the adjustment of pistons upon which the canted feeding rolls are mounted.

In FIG. 6 there is shown a fourth embodiment of apparatus in accordance with the invention. Parts which are similar to those in previously described embodiments are designated by the same reference characters but with the suffix d.

In FIG. 6 the pressure exerted upon pistons 5d is produced directly by the regulating element, which is shaped as a conical body 15d, moving rotationally along a thread 20d of housing part 3d and pressing the pistons 5 with its internal conical surface 7d. In this case the outer ends of pistons 5d are also shaped conically. In order to reduce the frictional resistance in sliding, the outer ends of the pistons are provided with rotating balls 16d.

Figure 7:
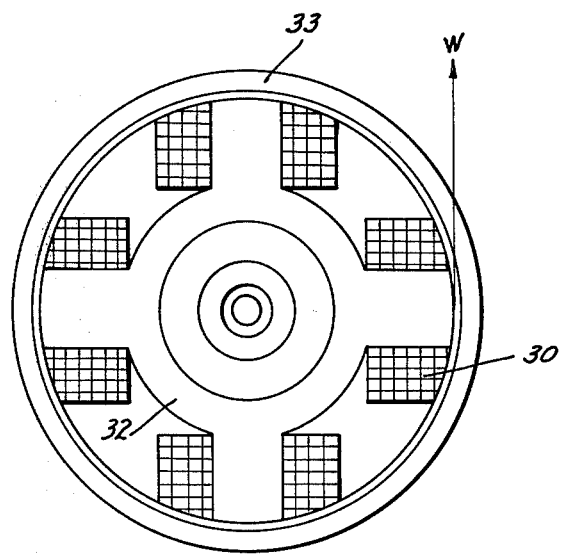
FIG. 7 is a view in end elevation of a coil for producing a tangential magnetic field, the coil being disposed interiorly of a sliding disc associated with the adjusting mechanism for the feeding rolls.
Figure 8:
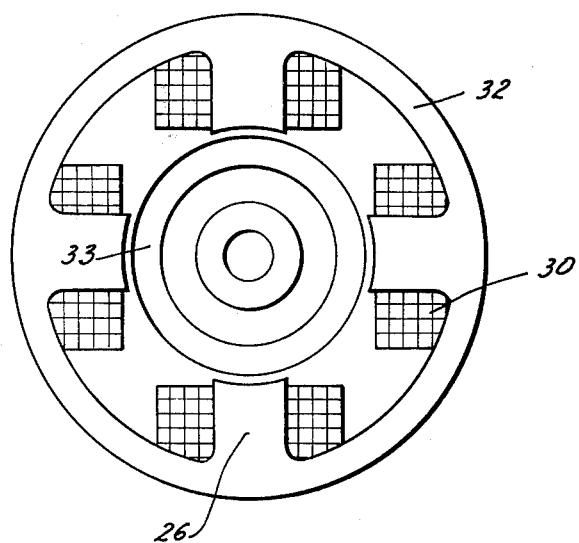
FIG. 8 is a view similar to FIG. 7 but with the coil disposed radially outwardly of the sliding disc.

FIGS. 7 and 8 show respectively the construction of internal and external coils which may be employed to produce tangential magnetic fields in apparatus such as that shown in FIG. 6. In FIG. 7 the windings 30 are disposed axially and produce a tangential electromagnetic field W. Windings 30 are wound in a stator with an iron core 32. In FIG. 8 a stator disposed externally with respect to the dynamic element 33 or 17 of the apparatus has a plurality of radially extending pole pieces 26 on the iron core 32. In both of the constructions shown in FIGS. 7 and 8 a tangential electromagnetic field extending in the direction W is produced.

Figure 9:
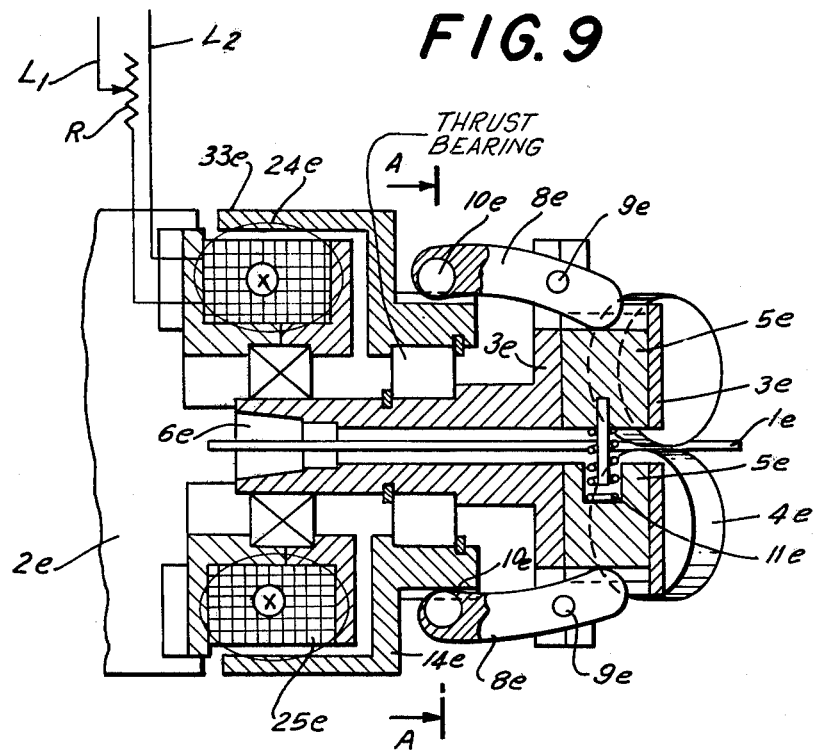
FIG. 9 is a view in longitudinal axial section of a fifth embodiment of electrode wire feeding apparatus provided with means for adjusting the pushing force exerted upon the electrode wire by means of a cam actuated by an eddy magnetic field.
Figure 10:
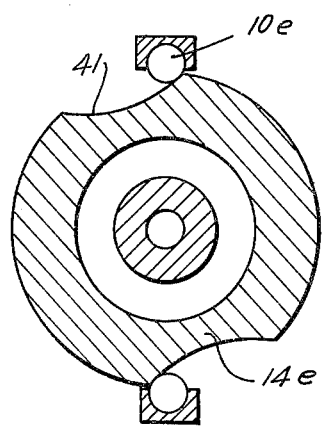
FIG. 10 is a view in transverse section through the cam of FIG. 9, the section being taken along the line A—A of FIG. 9, the cam followers associated with the cam being shown in a position corresponding to the final tightening of the dynamic element, that is the cam.

In FIGS. 9 and 10 a fifth embodiment of the apparatus of the invention is shown. In such figures parts which are similar to those of previously described embodiments are designated by the same reference characters but with an added suffix e. As shown in FIGS. 9 and 10, a cam 14 is provided with sector slits 41 in the cylindrical disc, which is integral with the cylindrical body 33e acting as a dynamic element. This cylindrical body 33e is supported in a housing part 3e by means of a bearing. On the internal side of cylindrical body 33e there is disposed concentrically a coil 25e which produces, depending on the type of its windings, an eddy or a tangential magnetic field 24e. By means of the sector slits 41, cam 14 is in contact with levers 8e by means of balls 10e (FIG. 10).

The apparatus of FIGS. 9 and 10 operates as follows:

Housing 3e, which is rigidly fastened to the shaft of motor 2e, is rotated by the rotatial movement of the motor. The cylindrical body 33e with cam 14 rotates as a result of the contact of rolls 12e with the sector slits 41 of cam 14, being supported in bearing. When coil 25e produces an eddy or tangential electromagnetic field 24e, it is closed through cylindrical body 33e, acting as a dynamic element, causing it to decelerate. This leads to a relative rotation of cylindrical body 33e, or of cam 14, respectively, with respect to housing part 3e, and hence to a climbing of levers 8e along the sector slits 41 of cam 14. Thus levers 8e press with their back ends the pistons 5e and respectively the rolls 4e against the electrode wire 1.

Figure 11:
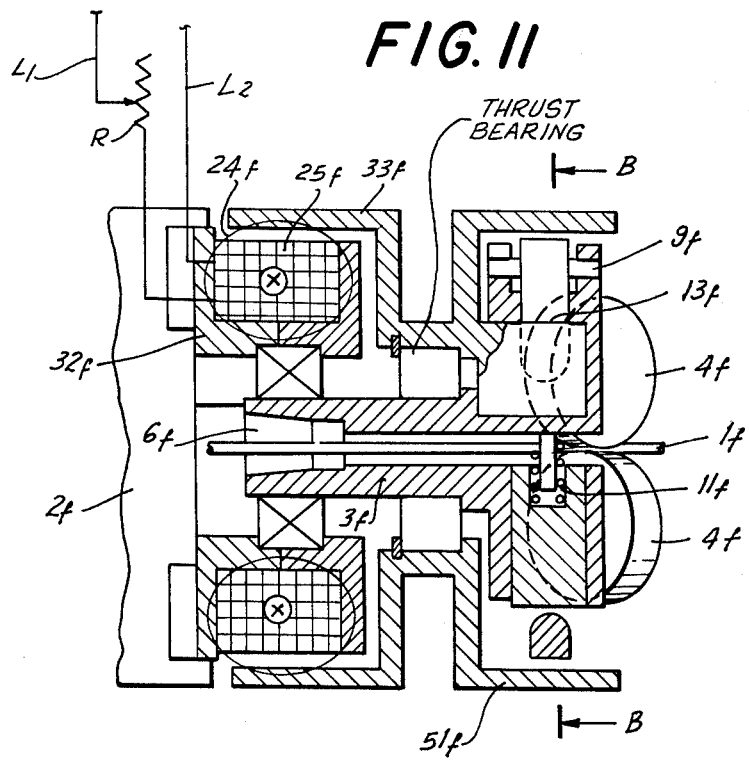
FIG. 11 is a view in longitudinal axial section of a sixth embodiment of apparatus in accordance with the invention wherein the adjustment of the pushing force exerted upon the electrode wire is effected by a cam actuated by an eddy or sliding magnetic field, the cam acting upon levers disposed perpendicularly to the longitudinal axis of the electrode wire being fed.

FIGS. 11 and 12 show a sixth embodiment of the apparatus in accordance with the invention. Parts in these figures which are similar to those in previously described embodiments are designated by the same reference characters but with an added suffix f. In this embodiment the levers 8f are disposed perpendicularly to the direction of feeding of the wire 1f. Cam 14f is shaped inside the cylindrical body 51f (FIG. 12), cam 14f being part of said cylindrical body 51f, which is an integral part of cylindrical body 33f, which acts as a dynamic element.

The apparatus of FIGS. 11 and 12 operates as follows:

Coil 25f produces an electromagnetic field 24f, which is closed through iron core 32f and acts as an eddy or a tangential electromagnetic field 24f, which causes a relative rotational motion of cylindrical body 33f with respect to cam 14f, and of the latter with respect to housing part 3f. This motion of body 33f and cam 14f lead to a displacement of levers 8f, which are with one of their ends, by means of rollers 12f, in contact with the working surface 13f, of cam 14f, while their other, shorter end is in contact with the pistons 5f, and as a result the wire feeding rolls 4f are pressed against the electrode wire 1f.

Figure 13:
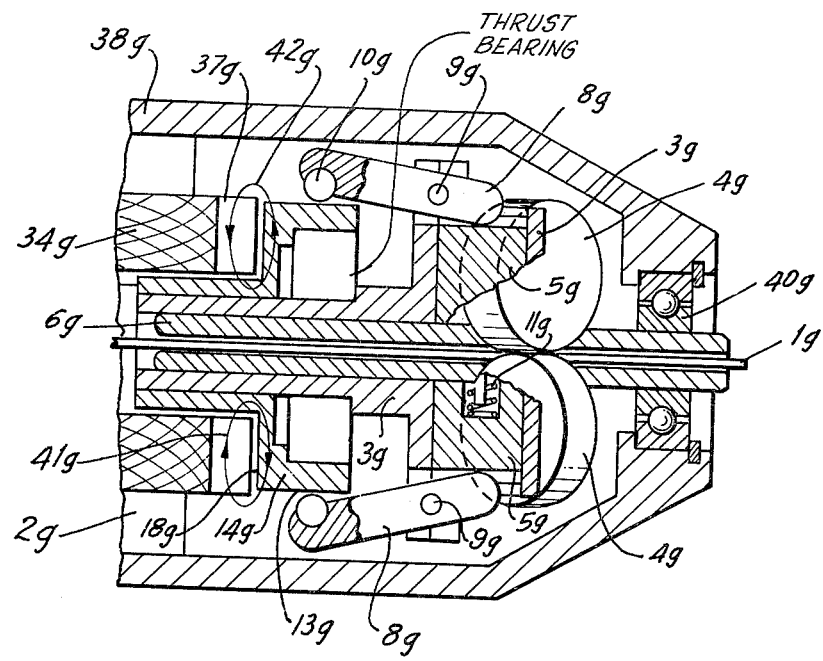
FIG. 13 is a view in longitudinal axial section of a seventh embodiment of electrode wire feeding apparatus in accordance with the invention, such apparatus employing the eddy electromagnetic field of the motor for driving the electrode wire feeding apparatus in order to adjust the pushing force exerted upon the electrode wire.

In FIGS. 13 and 14 there is shown a seventh embodiment of apparatus in accordance with the invention. Parts in FIGS. 13 and 14 which are similar to those in previously described embodiments are designated by the same reference characters but with a suffix g. The apparatus of this embodiment sets the electrode wire feeding rollers 4g by using the electromagnetic field of the rotor of the electric motor 2g itself.

In this design, the shaft 6g of electric motor 2g is connected rigidly to the elongated portion of housing 3g. Cam 14g can rotate freely around bearing in the elongated portion. Balls 10g, attached to the longer arms of first class levers 8g, are in contact with the working profiles 13g of cam 14g. One end of cam 14g with a face 18g acts as a dynamic element, and this face 18g has a minimum clearance with respect to the roller windings 34g of the electric motor 2g, which are separated by slits 37g from the face 18g.

A common cover 38g closes the motor 2g and the apparatus. The front end of this cover is supported by means of a bearing 40g to the shaft of the electric motor 2g. To the front portion of shaft 6g of the electric motor there are machined two opposite sector slits with a diameter corresponding to the diameter of the wire feeding rolls 4g.

The embodiment of FIGS. 13 and 14 operates as follows:

When an electric current flows in the rotor of motor 2g, there is produced around the windings an eddy magnetic field 42g, whose lines of magnetic force 41g are closed through the face 18g of cam 14g, acting as a dynamic element. This electromagnetic field 42g exerts a resistance to the rotation of cam 14g, which lags behind relatively in its rotation around housing part 3g, thus acting on levers 8g, and these act in turn on pistons 5g and rolls 4g.

The electromagnetic coils in FIGS. 1, 2, 5, 6 and 9 are energized from a source of power (not shown) through lines $L_1$ and $L_2$. A rheostat R is interposed in line $L_1$. The degree of energization of the coils can, therefore, be controlled as desired from outside the electrode wire feeding apparatus to vary the feeding effect of the canted rolls, even while the welding apparatus and electrode wire feeding apparatus are operating.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. An apparatus for the planetary feeding of electrode wire, comprising a housing, means for mounting the housing for rotation about its axis, opposed canted rolls mounted on the housing on opposite sides of the axis of the housing for engaging and feeding electrode wire along the axis of the housing, means movable relative to the housing for adjusting the force with which the rolls engage the electrode wire, means for rotating the housing about its axis, and means including an electromagnetic coil and an element variably responsive to variations in the magnetic field produced by the energization of the coil for moving the adjusting means to adjust the force with which the rolls engage the electrode wire.

2. Apparatus as claimed in claim 1, wherein the adjusting means reciprocates axially of the housing.

3. Apparatus as claimed in claim 1, wherein the adjusting means turns relative to the housing.

4. Apparatus as claimed in claim 1, wherein the adjusting means reciprocates axially of the housing and turns relative to the housing.

5. Apparatus as claimed in claim 1, wherein the adjusting means rotates synchronously with the housing and reciprocates axially with respect thereto.

6. Apparatus as claimed in claim 1, wherein the adjusting means is a cone.

7. Apparatus as claimed in claim 1, wherein the adjusting means is a cam.

8. Apparatus as claimed in claim 1, wherein the adjusting means is threadedly connected to the housing, and wherein the means for moving the adjusting means relative to the housing selectively restrains the adjusting means from synchronous rotation with the housing about the axis of the housing.

9. Apparatus as claimed in claim 1, wherein the electromagnetic coil is the coil of a solenoid and the element variably responsive to variations in the energization of the coil forms a plunger for the solenoid coil, the plunger being connected to the adjusting means to move it axially of the housing to adjust the force with which the feeding rolls engage the electrode wire.

10. Apparatus as claimed in claim 1, wherein a part of the adjusting means is cup-shaped and is made of ferromagnetic material, and the electromagnetic coil is disposed within the cup-shaped portion of the adjusting means.

11. Apparatus as claimed in claim 1, wherein the adjusting means includes a body with a conical surface, and means which engage and follow the conical surface for varying the force with which the rolls engage the electrode wire and for varying the spacing between opposed rolls.

12. An apparatus in accordance with claim 11, wherein the conical surface is an internal conical surface.

13. Apparatus in accordance with claim 1, wherein the adjusting means and the means responsive to variations in the magnetic field are combined in one common body in one end of which there is provided an internal cam with angularly spaced cam sectors for adjusting the respective feeding rolls, the other end of the common body is cup-shaped, the electromagnetic coil is disposed within the cup-shaped end of the common body, and said common body is rotatably mounted on the housing.

14. Apparatus as claimed in claim 13, wherein the electrode wire feeding rolls are mounted on the ends of first arms of first-class levers, the front portion of the common body contains an internal cam with similar cam surfaces for adjusting each of the feed rolls, and comprising cam followers on the other arms of the first class levers engaging the respective cam surfaces.

15. An apparatus as claimed in claim 1, wherein the means for rotating the housing is an electric motor having a hollow drive shaft which is mounted coaxial of the housing and is rigidly fastened thereto, and the adjusting means comprises a cam with an elongated back cylindrical portion which is rotatably mounted upon the housing for rotation with respect thereto, the elongated back cylindrical portion being embraced by the windings of the stator of the electric motor, the elongated back portion of the cam being made of ferromagnetic material, whereby the cam is restrained from rotation with the housing by the interaction of the magnetic field of the stator of the motor and the elongated back cylindrical portion of the cam.

16. Apparatus in accordance with claim 15, wherein the electric motor and the electrode wire feeding mechanism are covered by a common cover, the front portion of the hollow shaft of the electric motor being supported in the said common cover.

* * * * *